United States Patent [19]

Renz

[11] 4,401,942
[45] Aug. 30, 1983

[54] MONITORING SYSTEM FOR A CAPACITOR BATTERY IN AN AC VOLTAGE NETWORK

[75] Inventor: Klaus Renz, Fürth, Fed. Rep. of Germany

[73] Assignee: Siemens Aktiengesellschaft, Munich, Fed. Rep. of Germany

[21] Appl. No.: 265,453

[22] Filed: May 20, 1981

[30] Foreign Application Priority Data

May 27, 1980 [DE] Fed. Rep. of Germany ....... 3020128

[51] Int. Cl.³ ............................................ G01R 11/52
[52] U.S. Cl. ................................. 324/60 C; 324/427; 324/434
[58] Field of Search .................. 324/60 C, 60 R, 426, 324/427, 430, 434, 444, 57 Q, 57 R, 51

[56] References Cited

U.S. PATENT DOCUMENTS 4,243,933 1/1981 Rollman ........................ 324/60 C X

FOREIGN PATENT DOCUMENTS 52-75472 6/1977 Japan .................................. 324/427
55-147367 11/1980 Japan .................................. 324/427

Primary Examiner—Stanley T. Krawczewicz
Attorney, Agent, or Firm—Kenyon & Kenyon

[57] ABSTRACT

A monitoring system for a capacitor battery, the capacitor battery having a plurality of parallel legs, each with a plurality of sectional capacitors connected in series with fuses. Adjacent ones of the sectional capacitors are connected to one another by continuous cross lines. Electronic simulation circuitry is provided for producing a signal corresponding to the fundamental frequency component of a simulated capacitor voltage. A transient comparator circuit compares the fundamental frequency component of the simulated capacitor voltage with the fundamental frequency component of a measured capacitor voltage. Only rapid changes between the simulated capacitor voltage and the measured capacitor voltage are signaled as indicative of failures of one or more sectional capacitors in the capacitor battery. Slowly occurring voltage changes, which may correspond to variations in ambient temperature, do not lead to fault signaling.

1 Claim, 10 Drawing Figures

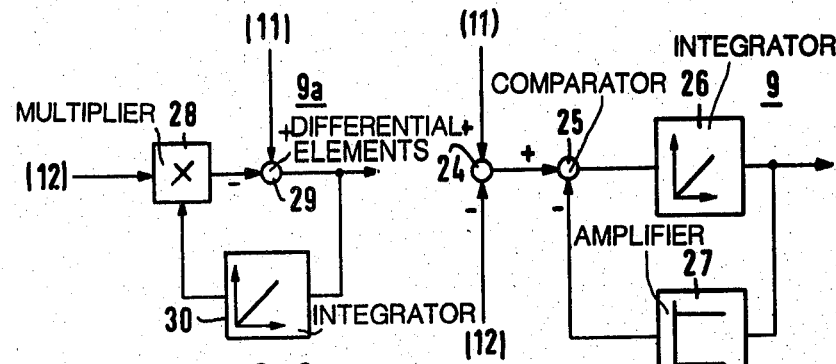
FIG 8
FIG 7
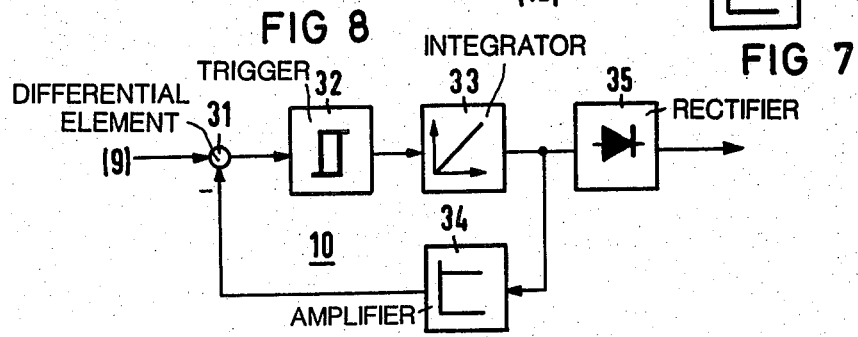
FIG 9
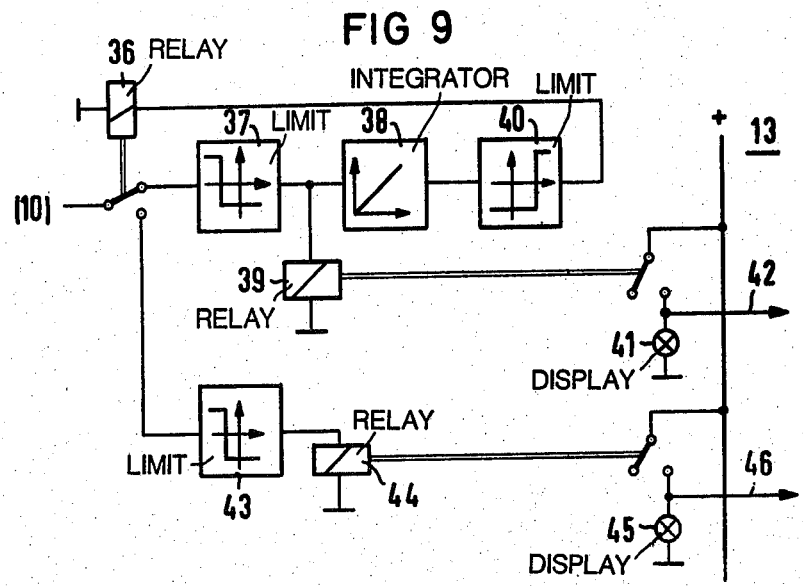
FIG 10

MONITORING SYSTEM FOR A CAPACITOR BATTERY IN AN AC VOLTAGE NETWORK

BACKGROUND OF THE INVENTION

This invention relates to monitoring systems for capacitor batteries, and more particularly, to a system for monitoring a capacitor battery in an AC voltage network, the capacitor battery consisting of a number of parallel legs, each with a number of series-connected sectional capacitors with fuses, adjacent ones of the sectional capacitors being connected to one another.

Capacitor batteries are used, for example, in wattless power compensation in AC or rotary voltage networks. In general, such capacitor batteries consist of a number of parallel legs, each of which contains a number of sectional capacitors, each sectional capacitor being connected in series with a fuse. Adjacent sectional capacitors are coupled to one another through continuous cross lines. A multiplicity of sectional capacitors may be contained in one capacitor battery. When a sectional capacitor short circuits, the adjacent, interconnected sectional capacitors discharge via the cross lines and through the fuse which is in series with the shorted sectional capacitor. Such a defect causes the fuse to open-circuit.

When a sectional capacitor in a capacitor battery fails, such as by short circuiting, the fundamental frequency component of the capacitor current changes only slightly, thereby rendering detection of a shorted sectional capacitor difficult to achieve with known current monitoring or current measuring systems. This problem is compounded by the fact that, in large capacitor batteries having many sectional capacitors, variations in capacitor current as a result of temperture changes may be greater than current changes caused by failure of one or more sectional capacitors.

It is, therefore, an object of this invention to provide a monitoring system for a capacitor battery in an AC voltage network which reliably detects the failure of one or more sectional capacitors using measurement techniques.

SUMMARY OF THE INVENTION

The foregoing and other objects are achieved by this invention which provides an electronic simulation for determining the fundamental frequency component of a simulated capacitor voltage. A transient comparator circuit is provided for comparing the fundamental frequency component of the simulated capacitor voltage with the fundamental frequency component of the measured capacitor voltage.

In one embodiment of the invention, the fundamental current through the capacitor battery is evaluated in an AC voltage network. In essence, the inventive system obtains by electronic simulation a reference signal for the fundamental current in an undistrubed state. This reference signal is compared with the measured fundamental capacitor current. Deviations between the simulated reference current signal and the measured current signal indicate a defect of a sectional capacitor. False defect indications are prevented, notwithstanding that capacitor current varies with temperature, by a transient comparison of the simulated and measured fundamental current. Thus, only rapid variations between the simulated and measured capacitor current are evaluated as a fault signal, while relatively slow variations do not cause fault signaling.

A monitoring system constructed in accordance with the principles of the invention can be used to monitor single-phase and three-phase capacitor batteries.

BRIEF DESCRIPTION OF THE DRAWINGS

Comprehension of the invention is facilitated by reading the following detailed description in conjunction with the annexed drawings, in which:

FIG. 7 is a block and line representation of a transient comparator;

FIG. 8 is a block and line representation of a further embodiment of a transient comparator;

FIG. 9 is a block and line representation of a timing system; and

FIG. 10 is a block and line representation of an embodiment of a signaling and release circuit.

DETAILED DESCRIPTION

Figure 1:
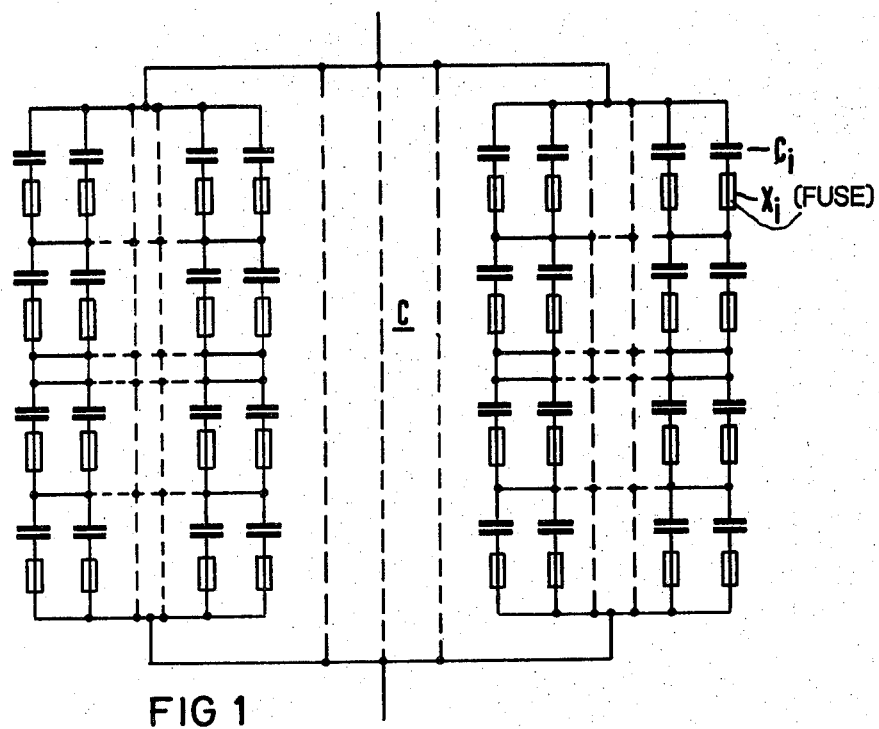
FIG. 1 is a schematic representation of a capacitor battery.

FIG. 1 shows a schematic representation of a capacitor battery C which is formed of a multiplicity of parallel legs, each such leg having a number of series-connected sectional capacitors $C_i$ with fuses $X_i$. Adjacent sectional capacitors are connected to one another by continuous cross lines. In some embodiments, a capacitor battery of the type shown in this figure may contain more than 100 sectional capacitors.

Figure 2:
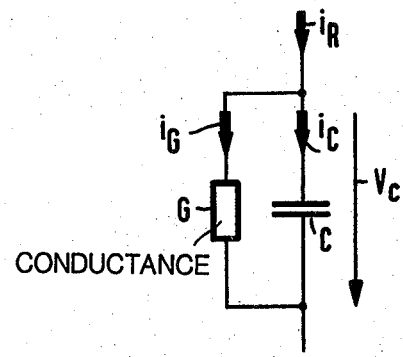
FIG. 2 is a schematic representation of an equivalent circuit of a capacitor battery.

FIG. 2 shows an equivalent circuit diagram of a capacitor battery having a capacitance C and a DC conductance G. Voltage $V_C$ is applied across the capacitor battery. A current $i_R$, which flows into the capacitor battery, is divided into a current $i_C$ which flows through capacitance C, and a current $i_G$ which flows through the DC conductance G.

Figure 3:
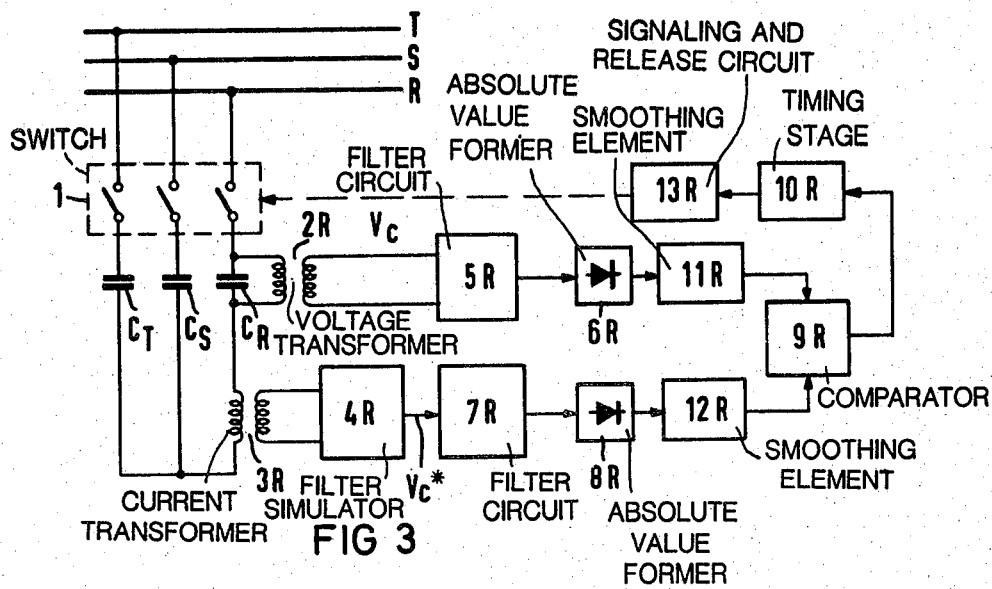
FIG. 3 is a block and schematic representation of a monitoring system constructed in accordance with the invention.

FIG. 3 shows a block and schematic representation of a monitoring system according to the invention for a capacitor bank in a three-phase current network. The capacitor bank comprises capacitor batteries $C_R$, $C_S$, $C_T$, which are connected to respective ones of phases R, S, and T of a three-phase current network by a switching device 1. The capacitor batteries are electrically coupled to one another at the respective electrodes which are not coupled to the three-phase current network.

In order to preserve the clarity of the drawing, only the monitoring system for capacitor battery $C_R$ is shown, the respect elements therein being designated by an index R. The remaining capacitor batteries, $C_S$ and $C_T$, are similarly constructed.

The monitoring system according to the invention is suitable for use in a single phase voltage network having a single phase capacitor battery. In such a single phase system, the electrode of the capacitor battery which is not coupled to the AC voltage network is grounded.

The voltage across capacitor battery $C_R$ is detected by a potential-isolating voltage measuring transformer 2R. Voltage measuring transformer 2R produces at its output a test voltage proportional to the respective phase voltage drops at voltage level which is suitable for signal processing. In some embodiments, potential-isolating voltage measuring transformer 2R may be followed by a decoupling element which serves to isolate the transformer from the following signal-processing electronic system. As a result of such a decoupling, the high voltage at the capacitor battery cannot be coupled into the electronic system.

Phase current $i_R$ is sensed by a potential-isolating current transformer 3R. Current measuring transformer 3R can also be followed by a decoupling element (not shown), as described hereinabove with respect voltage measuring transformer 2R. Current measuring transformer 3R is coupled at its output to an electronic filter simulator 4R, so as to conduct thereto a measurement signal which corresponds in amplitude to phase current $i_R$. Electronic filter simulator 4R provides at its output a simulated capacitor voltage $v_c^*$. The construction and mechanism of such an electronic capacitor simulator is described in detail hereinbelow with respect to FIG. 4. Simulated capacitor voltage $v_c^*$ is conducted to a filter circuit 7R which surpresses harmonic frequency components so as to provide at its output a signal corresponding to the fundamental frequency component. The construction and operation of suitable filter circuits will be explained hereinbelow with respect to FIGS. 5 and 6. The fundamental component of the simulated capacitor voltage is rectified in an absolute value fromer 8R and transformed in a smoothing element 12R into a DC voltage which is proportional to the amplitude of the fundamental component of the simulated capacitor voltage $v_c^*$.

The voltage across the capacitor battery which is sensed by voltage measuring transformer 2R is conducted to a filter circuit 5R having the same design as filter circuit 7R. The output voltage of filter circuit 5R, which corresponds to the fundamental component of the measured capacitor voltage, is rectified in an absolute value former 6R and transformed in a smoothing element 11R into a DC voltage which is proportional to the amplitude to the amplitude of the fundamental component of the measured capacitor voltage.

A transient comparator system 9R compares the fundamental component of the measured capacitor voltage with the fundamental frequency component of the simulated capacitor voltage. Embodiments of comparator systems are illustrated in FIGS. 7 and 8. Comparator system 9R provides at its output a corresponding output signal only when a difference between the measured capacitor voltage and the simulated capacitor voltage appears suddenly. Such sudden changes indicate the melting of a fuse in the capacitor battery, and hence to the failure of one or more sectional capacitors. However, relatively slow changes in the capacitance of the capacitor battery, such as changes caused by variations in temperature, do not produce a corresponding output signal from comparator system 9R.

The output signal of comparator system 9R is supplied to a timing stage 10R, which responds only if the output signal of comparator system 9R is present for a predetermined period of time. Timing stage 10R is coupled at its output to a signaling and release circuit 13, which indicates a capacitor fault, or in the case of a major capacitor fault, isolates the capacitor bank from the three-phase current network by actuation of switching device 1. An embodiment of such a signaling and release circuit is illustrated in FIG. 10.

Figures 4, 5:
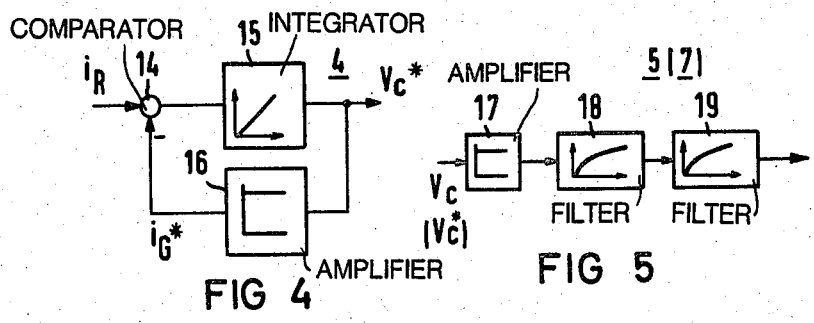
FIG. 4 is a block and line representation of an electronic simulator of a capacitor battery.
FIG. 5 is a block and line representation of an embodiment of a filter circuit.

FIG. 4 is a block and line representation of an electronic simulator 4 for a capacitor battery, which will be explained with reference to the equivalent circuit diagram shown in FIG. 2. The measured value $i_R$ for the capacitor battery current, is supplied at an input of a comparator element 14. Comparator element 14 compares the measured capacitor current $i_R$ with a simulated current $i_G^*$ through the DC conductance. Comparator element 14 is coupled at its output to an integrator 15, the output voltage of which represents the simulated capacitor voltage $v_c^*$. An amplifier 16 having an adjustable gain factor produces at its output the simulated current $i_G^*$ through the DC conductance, in accordance with Ohm's law.

FIG. 5 illustrates a circuit design for a filter which can be used in the place of filter circuits 5 or 7. The filter circuits shown in this drawing is provided with an amplifier 17 which receives at an input thereof the measured capacitor voltage $v_c$, or the simulated capacitor voltage $v_c^*$. Amplifier 17 is coupled at its output to a filter stage 18 which is subsequently coupled to a further filter stage 19. In accordance with FIG. 3, further filter stage 19 is coupled at its output to one of absolute value formers 6R or 8R.

Figure 6:
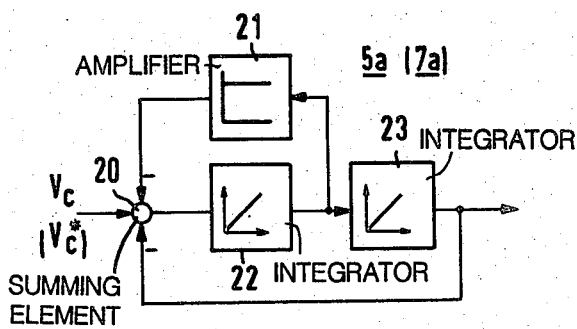
FIG. 6 is a block and line representation of a further embodiment of a filter circuit.

FIG. 6 illustrates a further circuit design of a filter circuit which can be used in the place of filter circuits 5 or 7. Filter circuit 5a is designed as a resonant filter and comprises a summing element 20, an integrator 22 having an amplifier 21 connected in a feedback configuration, and a further integrator 23, these circuit elements being connected as shown in the figure. The input quantity to be smoothed, specifically the measured capacitor voltage $v_c$, or the simulated capacitor voltage $v_c^*$, is coupled at a noninverting input terminal of summing element 20. Summing amplifier 20 is provided at inverting input terminals with the output signal of filter circuit 5a, and the output signal of amplifier 21, respectively. The output signal of summing element 20 is supplied to first integrator 22, the output voltage of which is supplied to second integrator 23.

FIG. 7 shows an embodiment of a transient comparator circuit 9. The output voltage of smoothing element 11, which corresponds to the rectified and smoothen fundamental component of the measured capacitor voltage, is supplied to a comparator element 24. Comparator 24 receives at an inverting input terminal the output voltage of smoothing element 12, which corresponds to the rectified and smoothened fundamental components of the simulated capacitor voltage. A signal corresponding to such a comparison is conducted to a differentiator circuit comprising an integrator 26 with an input-side comparator element 25, as well as an amplifier 27 in the feedback of integrator 26. As a result of the operation of differentiator circuit 25, 26, and 27, only suddenly occurring output voltages of differential element 24 produce an output signal at transient comparator stage 9. As previously indicated, slowly occurring output voltages from differential elements 24, do not produce an output signal.

FIG. 8 shows a further embodiment of a transient comparator system which is particularly advantageous when relatively strong voltage fluctuations of the three-phase current network RST are present. Transient comparator system 9a is designed as a non-linear control circuit and contains a multiplier 28, a differential element 29, and an integrator 30. The output voltage signal of smoothing element 12, which corresponds to the rectified and smooth fundamental component of the simulated capacitor voltage, is provided at one input of mmultiplier 28. Multiplier 28 is coupled at its output terminal to an inverting input terminal of differential element 29. Differential element 29 further receives at a non-inverting input the output voltage signal of smoothing element 11, which corresponds to the rectified and smoothened fundamental component of the measured capacitor voltage. Differential element 29 is coupled at its output terminal to the input terminal of integrator 30. The output voltage signal of integrator 30 is conducted to a second input of multiplier 28. Thus, the output signal of differential element 29 corresponds to the output signal of transient comparator system 9a. It should be noted that fluctuations in the voltage of a three-phase current network do not lead to false fault indications because, when network voltage fluctuations occur, both the measured capacitor voltage and the simulated capacitor voltage vary simultaneously and in the same direction.

FIG. 9 shows a block and line representation of a timing member 10. The output voltage signal of transient comparator system 9 is supplied to a non-inverting input terminal of differential element 31. Differential element 31 is coupled at its output terminal to a trigger 32, which produces at its output a signal corresponding to the polarity of its input voltage signal. Trigger 32 is coupled at its output to an integrator 33 which produces an output voltage signal which is feedback through a proportional amplifier 34 and to an inverting input terminal of differential element 31. In operation, an output signal of transient comparator circuit 9 causes trigger 32 to respond. The output of trigger 32 causes integrator 33 to build-up an integration signal. Amplifier 34 causes the input voltage of trigger 32 to be reduced until trigger 32 produces an output signal of opposite polarity, thereby resetting integrator 33. In this manner, timing element 10 produces a corresponding signal after a delay.

If the monitoring system is constructed so as to respond only upon isolation of a leg of the capacitor battery by the opening of a fuse, the output signal of timing element 10 may be supplied directly to signaling and release circuit 13. However, if the monitoring system must additionally respond upon the occurrence of a short circuit in the capacitor battery, timing element 10 is then coupled to a rectifier 35, because the isolation of a leg of the capacitor battery resulting in an open fuse produces a reduction in the current, while a short circuit condition in the capacitor battery produces an increase in the current.

FIG. 10 is a block and line representation of a signaling and release circuit 13. The output signal of timing element 10 is conducted to counting stages which comprise a pair of input-side limit indicators 37 and 43. Limit indicators 37 and 43 are adjusted so that sudden differences between the measured and simulated capacitor voltages, which are caused by defective sectional capacitors in the capacitor battery, result in an output signal of a respective limit indicator. The response thresholds of limit indicators 37 and 43 are adjusted so as to be identical.

Limit indicator 37 of a first counting stage is coupled at its output to an integrator 38, which conducts an output signal to a further limit indicator 40. The output signal of further limit indicator 40 controls a relay 36 at the input of limit indicator 37. The output signal of limit indicator 37 controls a relay 39 which controls a display lamp 41. A monitor signal can be provided at output line 42, which is in parallel with display lamp 41.

Limit indicator 43 controls a relay 44 in a second counting stage. Relay 44 controls an indicator 45 which is connected with an output line 46 so as to provide an alarm signal.

Upon the occurrence of a defect in a sectional capacitor in the capacitor battery, a corresponding input voltage is provided by means of the switching contact of relay 36, which is in the position shown in the figure, to input-side limit indicator 37 of the first counting stage. This causes limit indicator 37 to respond and actuate relay 39. The lighting of indicator 41 indicates a first defective sectional capacitor in capacitor battery $C_R$. After limit indicator 37 has responded, integrator 38 accumulates a voltage until its output voltage reaches the response threshold of further limit indicator 40. The output signal of further limit indicator 40 controls relay 36, so as to cause timing element 10 to be connected with the second counting stage, having elements 43 through 46. In the event of a second defective sectional capacitor, the second counting stage is actuated so as to light indicator 45.

The integration interval of integrator 38 in the first counting stage is adjusted so as to be in the order of approximately a few seconds, while the down integration time is considerably less than one second. The up-integration time is longer than the maximum time until a fuse opens during a short circuit condition caused by a defective sectional capacitor. The down integration time determines how long one must actuate a reset switch (not shown) to acknowledge that a capacitor fault has been eliminated. The resulting down integration of integrator 38 causes relays 36 and 39 or 44 to be brought back to the original positions shown in the figure.

The counting stages of signaling and relase circuit 13 make possible an advantageous staggered monitoring strategy. If only one defective sectional capacitor is signaled, the capacitor battery can remain in operation for a certain time, which may illustratively be long enough to call the maintenance personnel. However, if two defective sectional capacitors are signaled, the filter circuit must be immediately disconnected. The signal on line 46 is used to actuate switching device 1. In embodiments wherein a finer degree of monitoring strategy is required, signaling and release circuit 13 can be expanded to contain additional counting stages.

Although the inventive concept has been described in terms of specific applications and embodiments, other applications and embodiments, in light of this teaching, would be obvious to persons skilled in the pertinent art. Accordingly, it is to be understood that persons skilled in the art can generate additional embodiments without departing from the scope of the invention. The drawings and descriptions in this disclosure are proffered to facilitate comprehension of the invention, and should not be construed to limit the scope thereof.

What is claimed is:

1. A monitoring system for a capacitor battery in an AC voltage network, the capacitor battery being of the type having a plurality of parallel legs, each such leg having a plurality of series-connected sectional capacitors with fuses, adjacent ones of the sectional capacitors being connected by continuous cross lines, the monitoring system comprising:

electronic simulator means for producing a signal corresponding to a fundamental frequency component of a simulated capacitor voltage; and
transient comparator means for comparing said fundamental frequency component of said simulated compacitor voltage with a fundamental frequency component of a measured capacitor voltage.

* * * * *